(12) United States Patent
Walden (10) Patent No.: US 9,932,070 B2
(45) Date of Patent: Apr. 3, 2018

(54) WORK VEHICLE

(71) Applicant: KUBOTA CORPORATION, Osaka (JP)

(72) Inventor: Robert Walden, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 120 days.

(21) Appl. No.: 15/006,716

(22) Filed: Jan. 26, 2016

(65) Prior Publication Data

US 2017/0210417 A1  Jul. 27, 2017

(51) Int. Cl.
*B62D 7/18* (2006.01)
*B62D 7/16* (2006.01)
*A01D 34/64* (2006.01)

(52) U.S. Cl.
CPC .............. *B62D 7/18* (2013.01); *A01D 34/64* (2013.01); *B62D 7/16* (2013.01)

(58) Field of Classification Search
CPC ... B62D 7/08; B62D 7/12; B62D 7/18; B62D 3/02
USPC .......................................... 280/93.512, 93.51
See application file for complete search history.

(56) References Cited

U.S. PATENT DOCUMENTS

| | | | | |
|---|---|---|---|---|
| 2,347,628 A | * | 4/1944 | Cottrell | B61F 5/52 105/208 |
| 2,826,427 A | * | 3/1958 | Boughner | B60G 5/053 280/680 |
| 4,934,729 A | * | 6/1990 | Murata | B60G 3/265 280/124.136 |
| 6,264,241 B1 | * | 7/2001 | Horiuchi | B62D 21/183 180/291 |
| 6,431,569 B2 | * | 8/2002 | Handa | B60G 3/20 280/124.138 |
| 8,459,671 B2 | * | 6/2013 | Kuwabara | B62K 5/01 180/374 |
| 2006/0006623 A1 | | 1/2006 | Leclair | |
| 2013/0307243 A1 | | 11/2013 | Ham | |
| 2016/0214644 A1 | | 7/2016 | Cmich | |

FOREIGN PATENT DOCUMENTS

| | | |
|---|---|---|
| JP | H07-277215 | 10/1995 |
| WO | 2016/123004 | 8/2016 |

OTHER PUBLICATIONS

Extended European Search Report issued in Patent Application No. 16198182.4, dated May 22, 2017.

\* cited by examiner

*Primary Examiner* — James A English
(74) *Attorney, Agent, or Firm* — Greenblum & Bernstein, P.L.C.

(57) ABSTRACT

A work vehicle includes a pair of left and right steerable wheels, a pair of left and right drivable wheels, and a boss portion that supports the steerable wheel pivotally about a steering axis via a king pin. The boss portion is closer to a width center of the steerable wheel than a vehicle body inner lateral side end of the steerable wheel.

6 Claims, 8 Drawing Sheets

WORK VEHICLE

TECHNICAL FIELD

The disclosure relates to a work vehicle having a pair of left and right steerable wheels and a pair of left and right drivable wheels.

RELATED ART

An example of a work vehicle configured as above is known from Patent Document 1. The work vehicle disclosed in Patent Document 1 includes a pair of left and right steerable wheels ("steerable front wheels" in the document) and a pair of left and right drivable wheels ("drivable rear wheels" in the document). Each steerable wheel is pivotable about a steering axis ("pivot point" in the document). And, the steerable wheel is set with a caster angle and a king pin angle.

RELATED ART DOCUMENT

Patent Document

Patent Document 1: Japanese Unexamined Patent Application Publication No. Hei. 7-277215

SUMMARY OF THE INVENTION

Problem to be Solved by Invention

In the case of the work vehicle disclosed in Patent Document 1 above, there remains room for improvement in the respect of reduction of a distance (scrub radius) between the width center of the steering wheel and the steering axis for the sake of desirable decrease in the steering force of the steerable wheels.

In view of the above-described state of the art, there is a need for a work vehicle having superior steerability.

Solution

According to a characterizing feature of the present invention, a work vehicle comprises:

a pair of left and right steerable wheels;

a pair of left and right drivable wheels; and a boss portion that supports the steerable wheel pivotally about a steering axis via a king pin, the boss portion being closer to a width center of the steerable wheel than a vehicle body inner lateral side end of the steerable wheel.

With the above-described characterizing feature, as the boss portion is disposed closer to the width center of the steering wheel, the scrub radius is reduced, thus decreasing the steering force for the steering wheel. Thus, a work vehicle having superior steerability can be realized.

Further, in the present invention, preferably;

the steerable wheel is set with a caster angle that inclines the steering axis rearwards as seen in a side view.

Further, in the present invention, preferably;

the steerable wheel is set also with a king pin angle that inclines the steering axis towards a vehicle body laterally inner side as seen in the side view.

Further, in the present invention, preferably;

the king pin has an approximately L-shape extending between the steerable wheel and the boss portion.

Further, in the present invention, preferably;

the work vehicle further comprises:

an operating member for steering the steerable wheels; and a link member that operably links the operating member with the steerable wheels, and wherein the king pin includes an arm member to which the link member is connected.

Further, in the present invention, preferably;

the work vehicle further comprises:

an axle frame that supports the pair or left and right steerable wheels; and a mount bracket to which the axle frame is attached; and wherein the mount bracket includes a recess for avoiding interference with the link member.

Further, in the present invention, preferably;

the work vehicle comprises a mid-mount type grass mower.

EMBODIMENT OF THE INVENTION

An embodiment of the present invention will be explained based on the accompanying drawings. Incidentally, in the following explanation, a direction denoted with an arrow F in FIG. 1 and FIG. 2 represents a "vehicle body front side", a direction denoted with an arrow B in FIG. 1 and FIG. 2 represents a "vehicle body rear side", and a direction denoted with an arrow L in FIG. 2 represents a "vehicle body left side", and a direction denoted with an arrow R in FIG. 2 represents a "vehicle body right side", respectively.

[General Arrangement of Grass Mower]

Figure 1:
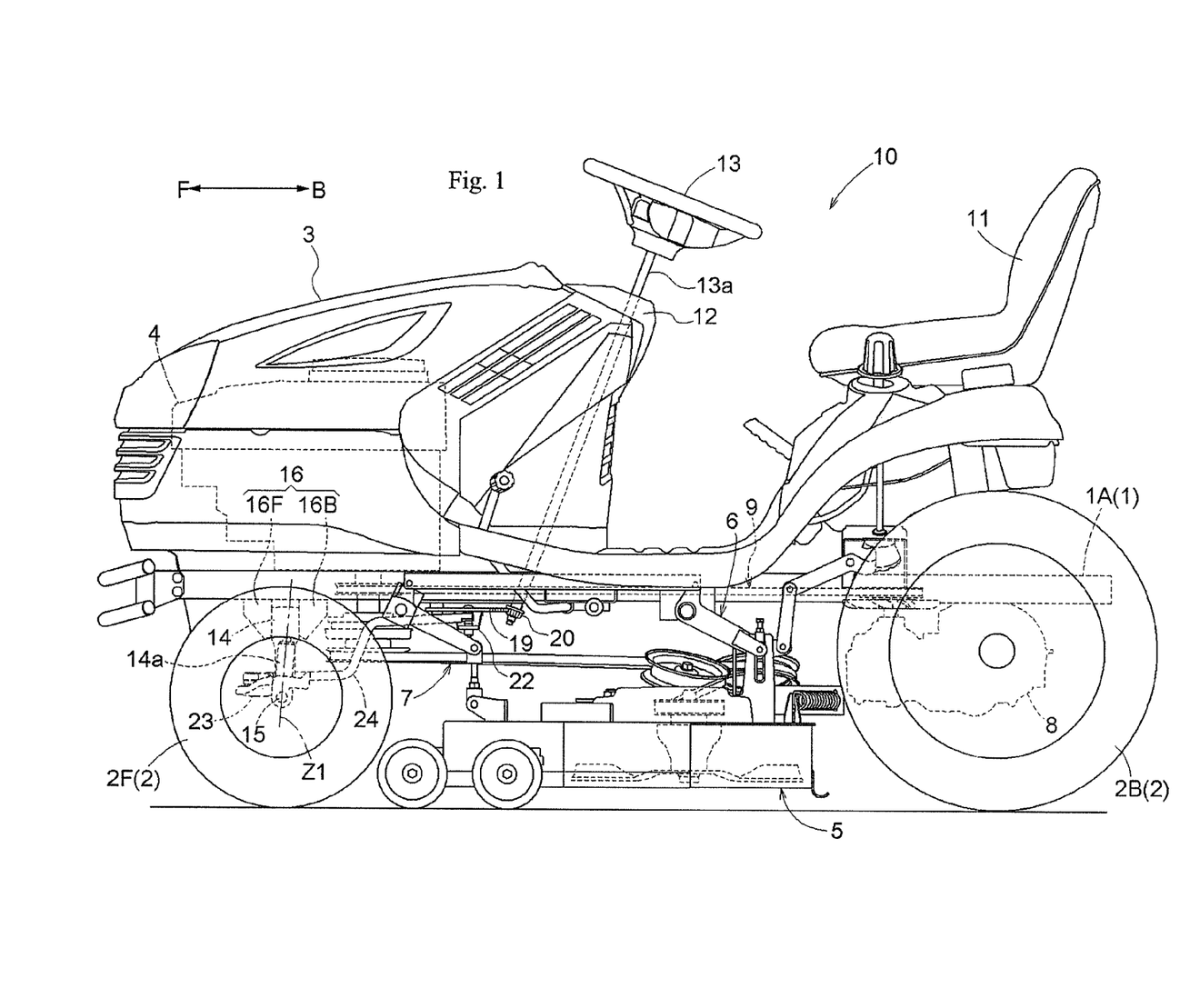
FIG. 1 is a left side view showing a grass mower.
Figure 2:
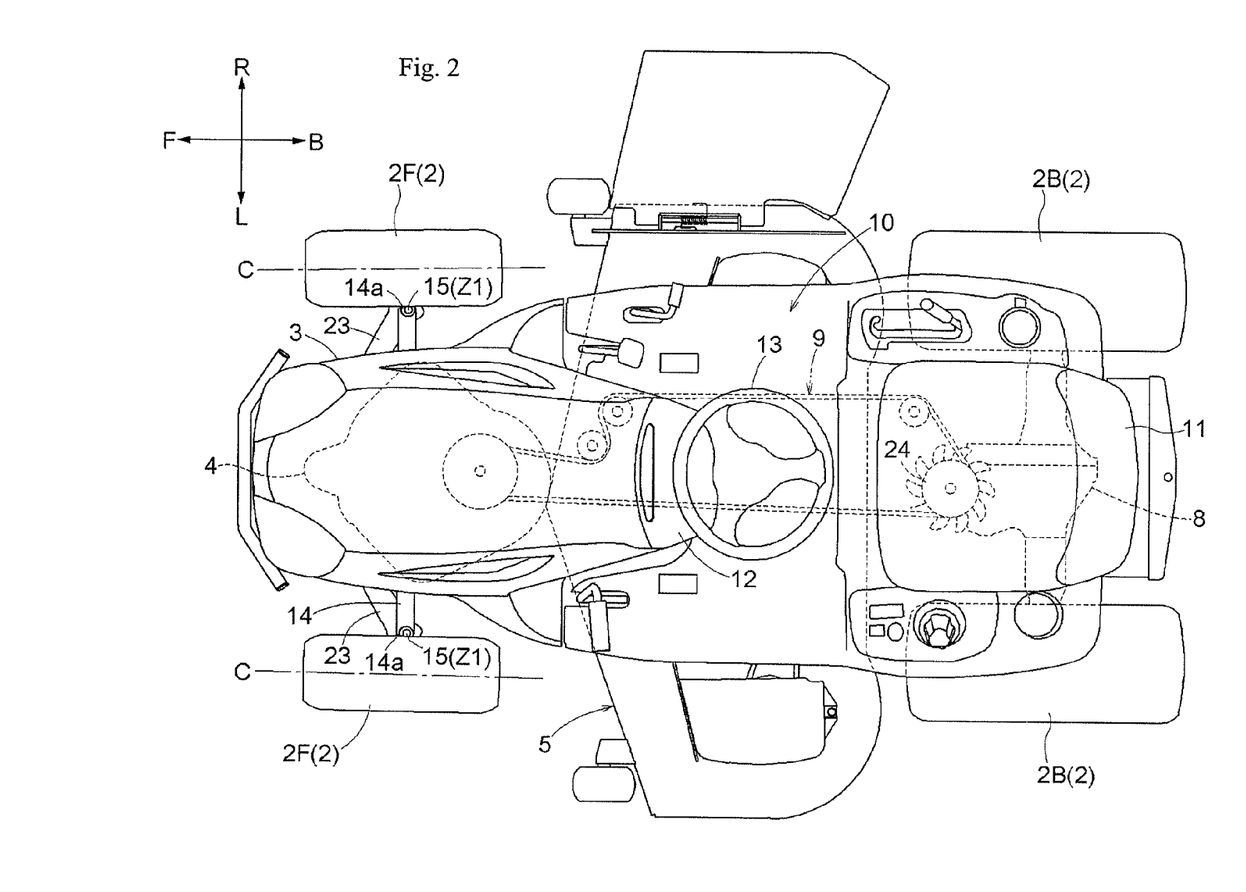
FIG. 2 is a plane view showing the grass mower.

FIG. 1 and FIG. 2 show a grass mower (a mid-mount type grass mower) corresponding to a "work vehicle" to which the present invention relates. This grass mower includes a vehicle body frame 1, and a wheel-type traveling device 2 that supports the vehicle body frame 1. The vehicle body frame 1 includes a pair of left and right main frames 1A that extend in the vehicle body front-rear direction. The traveling device 2 includes a pair of left and right steerable front wheels 2F (corresponding to "steerable wheels" relating to the present invention) and a pair of left and right drivable rear wheels 2B (corresponding to "drivable wheels" relating to the present invention). At a front half portion of the vehicle body frame 1, a hood 3 is mounted. Inside this hood 3, there is accommodated an engine 4 acting as a driving source for the traveling device 2, etc.

Between the front wheels 2F and the rear wheels 2B, a mower unit 5 is provided. This mower unit 5 is supported in a suspended manner to the vehicle body frame 1 via a lift mechanism 6 so that the mower unit 5 can be lifted up/down. Between the engine 4 and the mower unit 5, there is provided a mower belt transmission mechanism 7 configured to transmit a driving force of the engine 4 to the mower unit 5.

Between the pair of left and right rear wheels 2B, there is provided a transmission 8 that speed-changes the driving force of the engine 4 and transmits the resultant speed-changed force to the pair of left and right rear wheels 2B. Between the engine 4 and the transmission 8, there is provided a traveling belt transmission mechanism 9 that transmits the driving force of the engine 4 to the transmission 8.

At a rear half portion of the vehicle body frame 1, a driving section 10 is provided. This driving section 10 includes a driver's seat 11 and a front panel 12. The front panel 12 includes a steering wheel 13 (corresponding to "a steering wheel" relating to the present invention) for steering the front wheels 2F.

[Steering Arrangement for Front Wheels]

Figure 3:
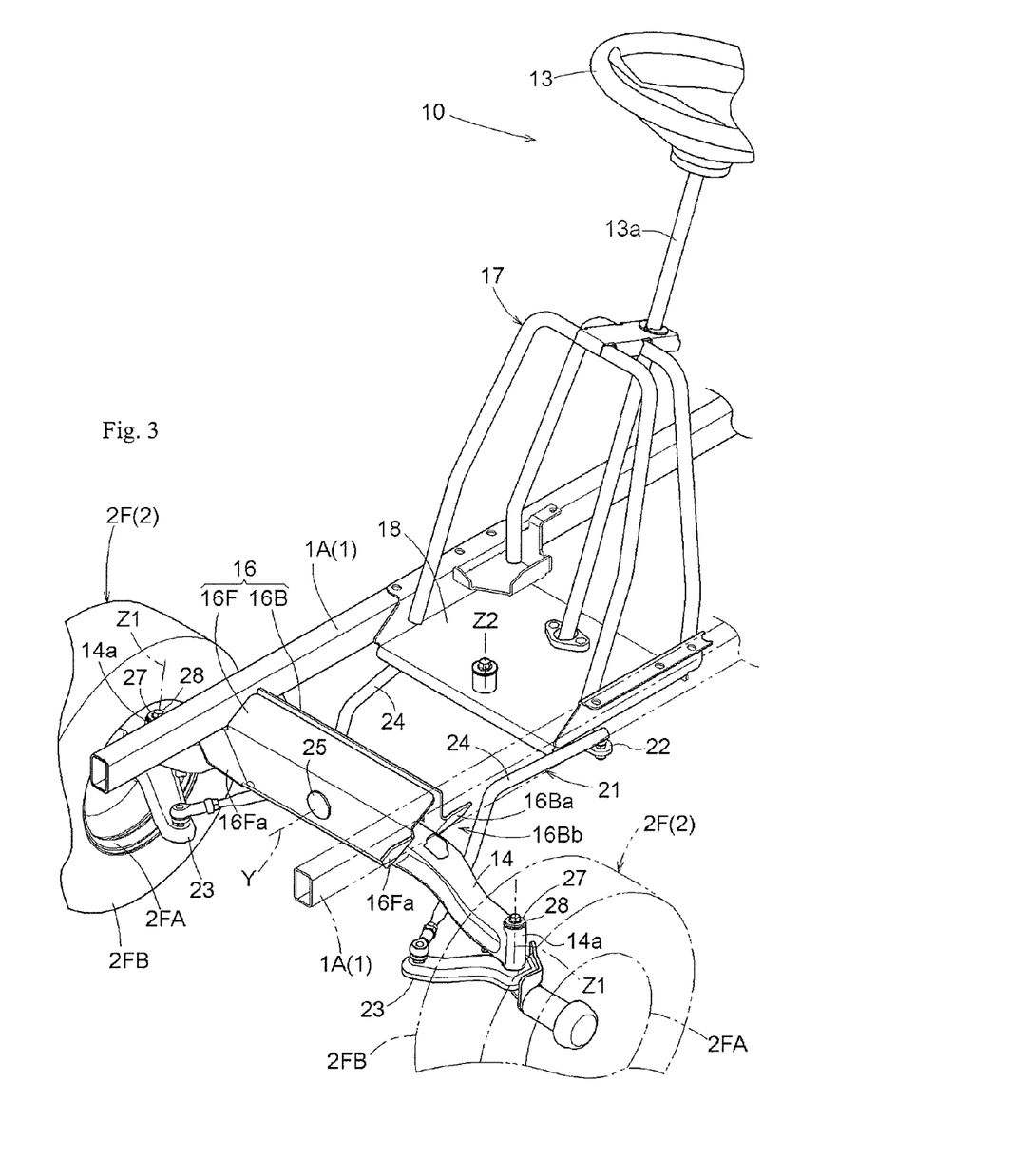
FIG. 3 is a perspective view showing a steering arrangement of a front wheel.
Figure 4:
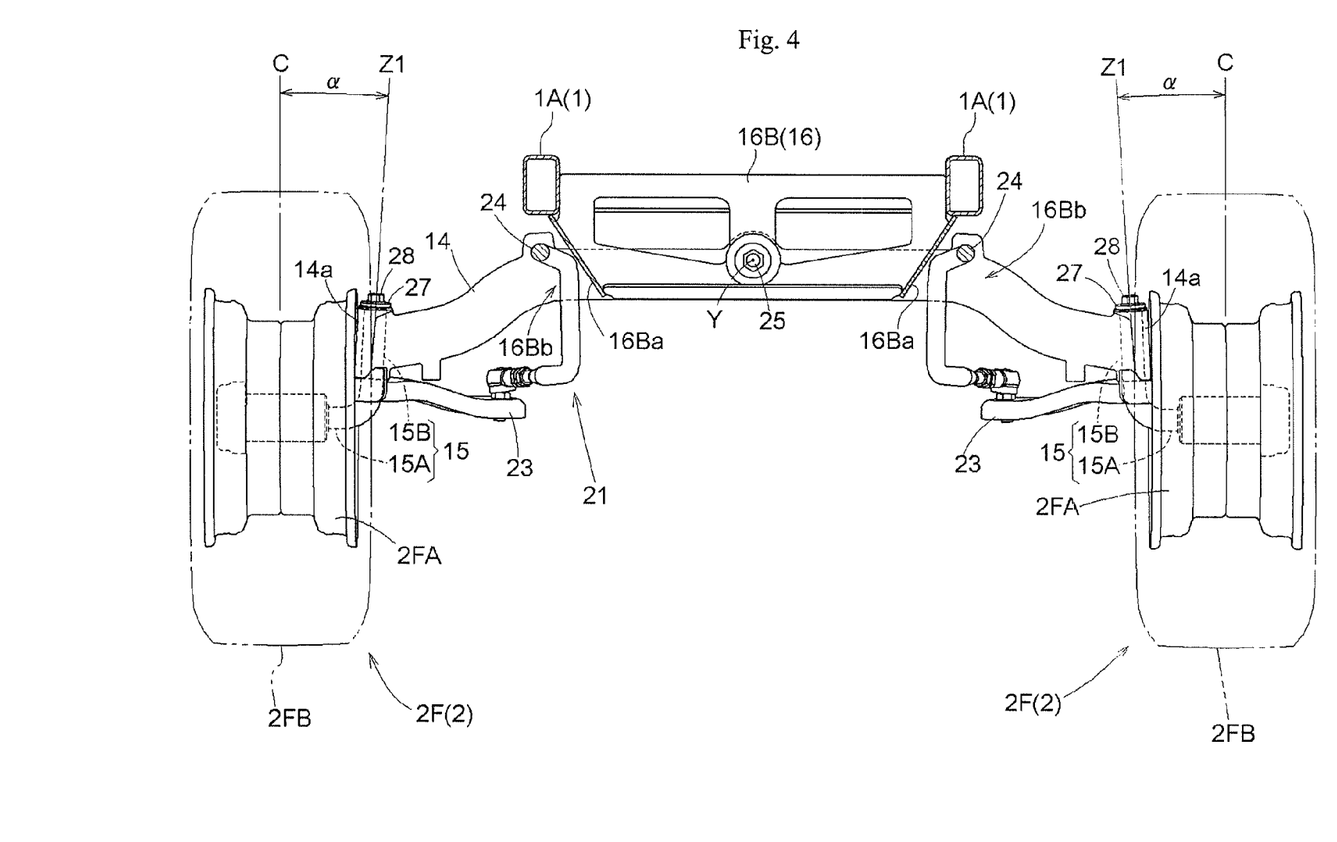
FIG. 4 is a rear view in section showing the steering arrangement of the front wheel.
Figure 5:
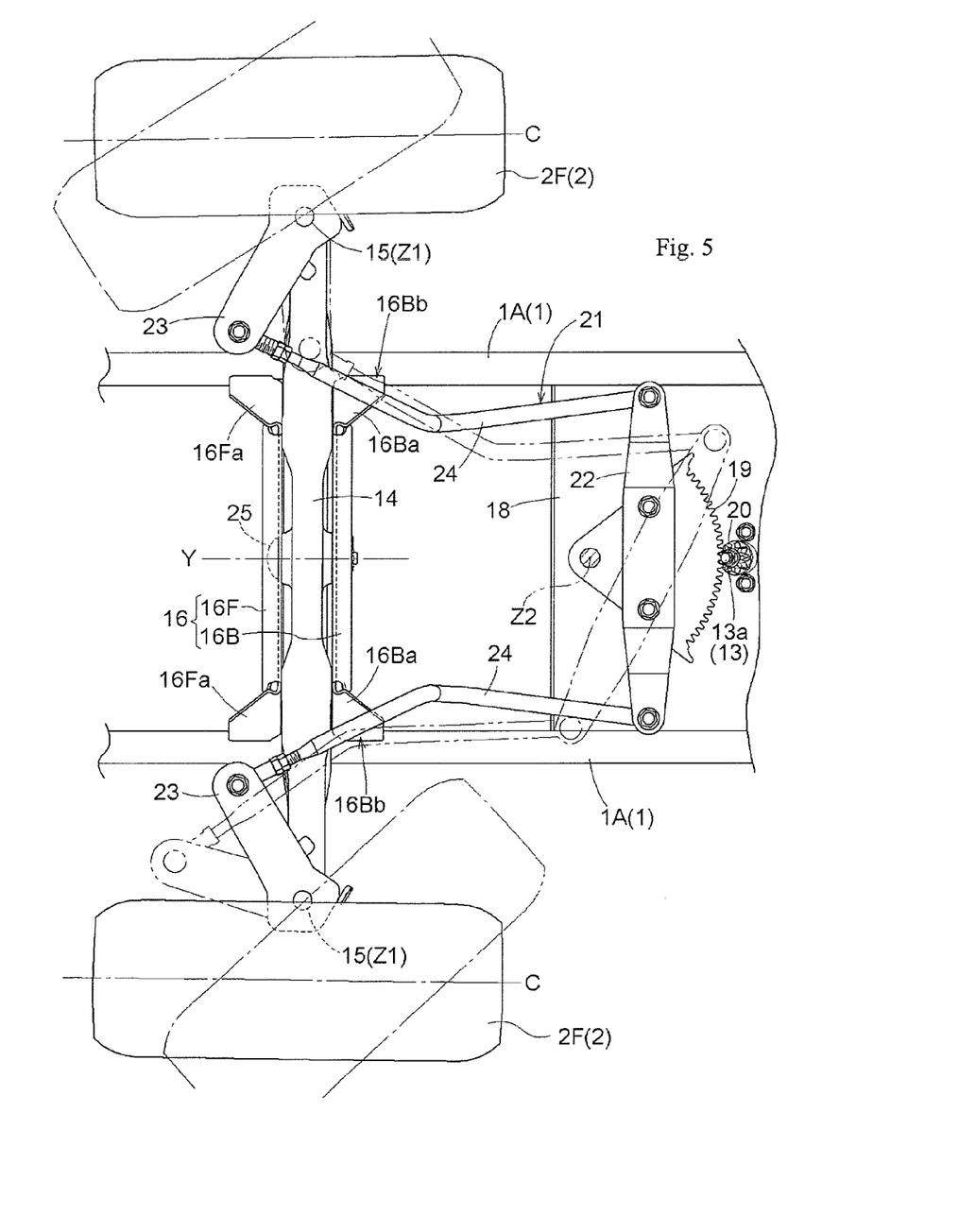
FIG. 5 is a bottom view showing the steering arrangement of the front wheel.

As shown in FIGS. 3 through 5, there is provided a front axle frame 14 (corresponding to "an axle frame" relating to the present invention) that supports the pair of left and right front wheels 2F. At each of left and right end portions of the front axle frame 14, there is formed a boss portion 14a which pivotally supports the corresponding front wheel 2F about a steering axis Z1 via a king pin 15. The front axle frame 14 is supported to a mount bracket 16 to be pivotable about a pivot axis Y extending in the vehicle body front-rear direction.

The steering wheel 13 is rotatably supported to a steering support frame 17 via a steering shaft 13a. The steering support frame 17 is supported to a deck 18. The deck 18 is provided between the pair of left and right main frames 1A. A lower end portion of the steering shaft 13a protrudes downwards from the deck 18. On the portion of the steering wheel 13a protruding downwards from the deck 18, there is provided a steering gear 20 which meshes with a sector gear 19.

A coupling mechanism 21 is provided for operably coupling the steering shaft 13a with the king pin 15. This coupling mechanism 21 includes a steering arm 22, a pair of left and right king pin arms 23 (corresponding to "arm members" relating to the present invention) and a pair of left and right drag links 24 (corresponding to "link members" relating to the present invention).

The steering arm 22 is integrally fixed to the sector gear 19. The sector gear 19 is supported to the deck 18 to be pivotable about a pivot axis Z2 extending in the vertical direction. To opposed free ends of the steering arm 22, rear end portions of the drag links 24 are pivotally connected. The king pin arm 23 is connected to the king pin 15 to be pivotable together with this king pin 15. To free ends of the king pin arm 23, front end portions of the drag links 24 are pivotally connected. Between the steering arm 22 and the respective king pin arm 23, the drag link 24 for operably linking the steering arm 22 with the king pin arm 23 is provided.

With the above-described arrangement, when the steering wheel 13 is rotatably operated about the steering shaft 13a, due to meshing between the steering gear 20 and the sector gear 19, the steering arm 22 is pivoted about the pivot axis Z2 together with the sector gear 19. And, as the drag link 24 is pushed/pulled, the king pin 15 is pivoted about a steering axis Z1 via with the king pin arm 23, thus changing the direction of the corresponding front wheel 2F.

The mount bracket 16 is provided between the pair of left and right main frames 1A. The mount bracket 16 includes a front bracket 16F disposed on the front side of the front axle frame 14 and a rear bracket 16B disposed on the rear side of the front axle frame 14. To this mount bracket 16, the front axle frame 14 is mounted via a mount pin 25 to be sandwiched from the front and rear sides between the front bracket 16F and the rear bracket 16R (see FIG. 6).

Figure 6:
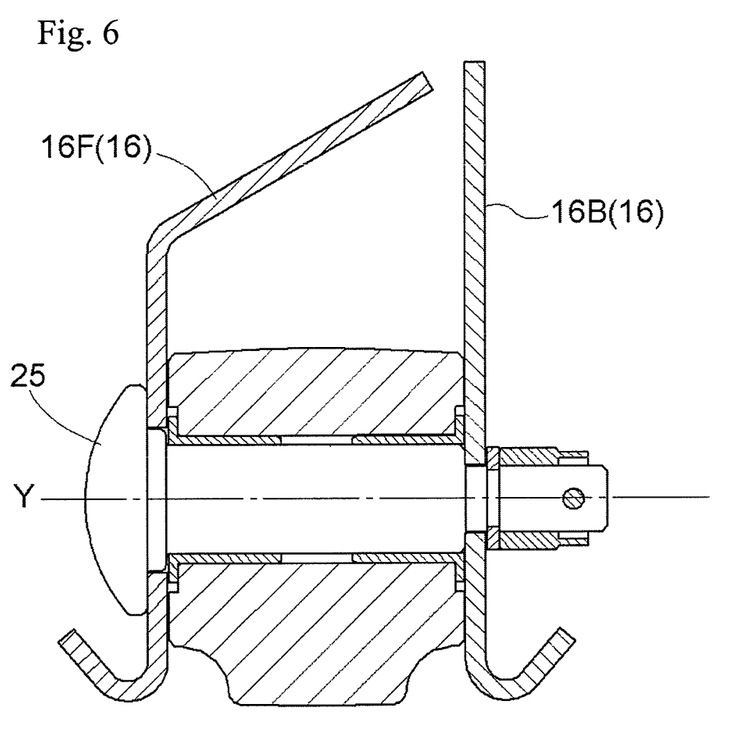
FIG. 6 is a left side view in section showing a state when a front axle frame is attached to a mount bracket.

At left and right opposed end portions of the front bracket 16F, front sloped portions 16Fa are formed respectively. Each front sloped portion 16Fa is sloped in such a manner that its lower end side is disposed progressively closer to the left-right center side of the vehicle body. At left and right end portions of the rear bracket 16B, rear sloped portions 16Ba are formed respectively. Each rear sloped portion 16Ba is sloped in such a manner that its lower end side is disposed progressively closer to the left-right center side of the vehicle body. On the vehicle body lateral outer side of the rear sloped portion 16Ba, there is formed a recess 16Bb for avoiding interference with the corresponding drag link 24. This arrangement serves to increase a movable range of the drag link 24, so that the turning radius of the vehicle body can be reduced advantageously.

[King Pin]

Figure 7:
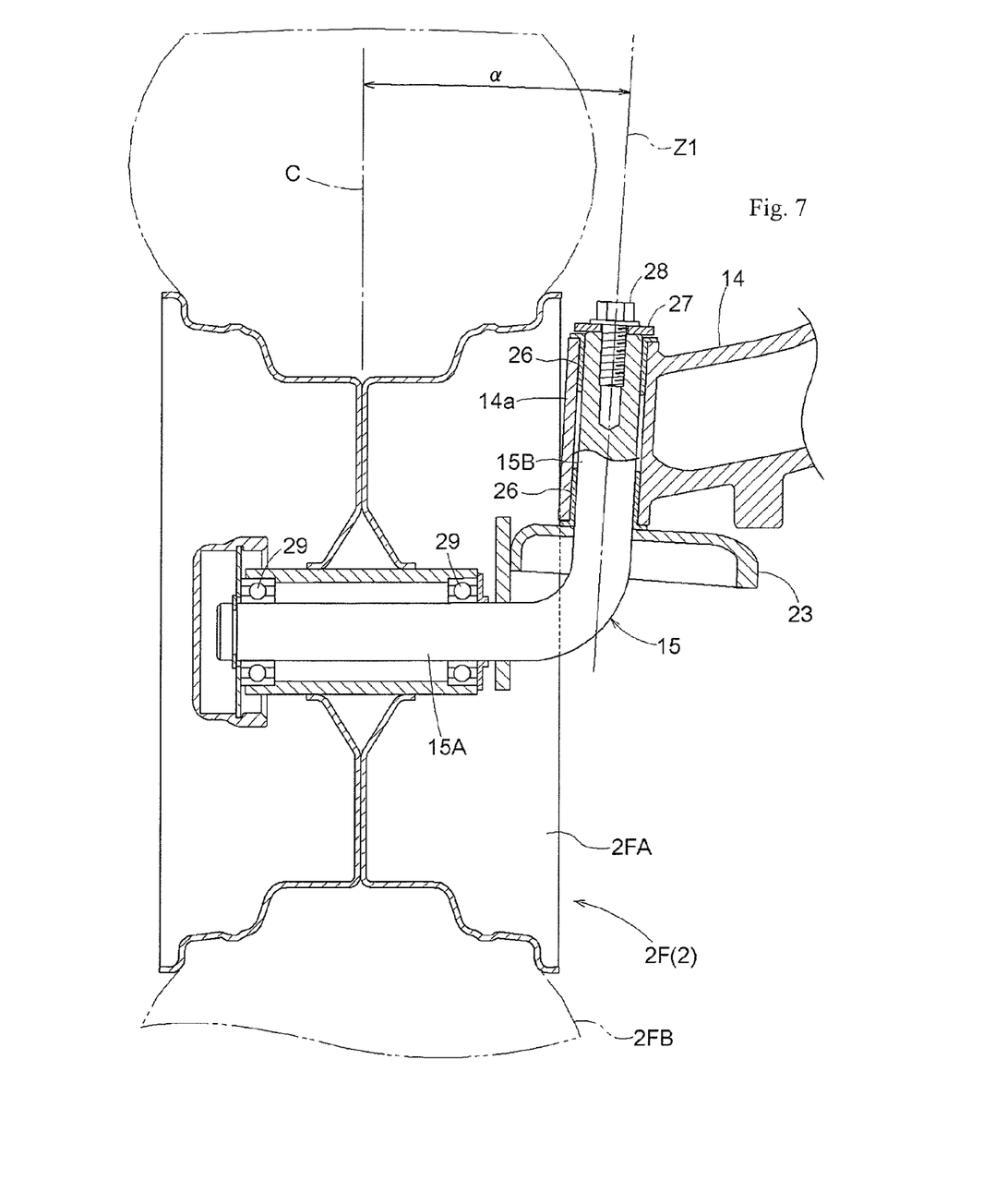
FIG. 7 is a left side view showing a state when the front wheel is supported to a boss portion via a king pin.

As shown in FIG. 7, the king pin 15 is provided in a form of a generally L-shape member extending between the front wheel 2F and the boss portion 14a. The king pin 15 includes a lateral shaft portion 15A to which the front wheel 2F is attached and a vertical shaft portion 15B which is to be attached to the boss portion 14a. The vertical shaft portion 15B is inserted into the boss portion 14a via a bush 26. Incidentally, instead of the bush 26, a bearing can be provided such that the vertical shaft portion 15B will be inserted into the boss portion 14a via the bearing. To the upper end portion of the vertical shaft portion 15B, a stopper washer 27 is fixed via a bolt 28. Incidentally, the stopper means for the vertical shaft portion 15B is not limited to the above-described stopper means using the washer 27, but can be any other stopper means. To the lateral shaft portion 15A, a wheel portion 2FA of the front wheel 2F is rotatably supported via a bearing 29.

[Boss Portion]

As shown in FIG. 7, the boss portion 14a is closer to toward a width center C of the front wheel 2F than a vehicle body lateral inner end of a tire portion 2FB of the front wheel 2F and also is closer to the width center C of the front wheel 2F than a vehicle body lateral inner end of the wheel portion 2FA of the front wheel 2F. Thus, in this boss portion 14a, its axis (steering axis Z1) is sloped towards the vehicle body lateral inner side as seen in a front view. Namely, the front wheel 2F is set with a king pin angle ($\alpha$) that inclines the steering axis Z1 towards the vehicle body lateral inner side as seen in the front view.

Figure 8:
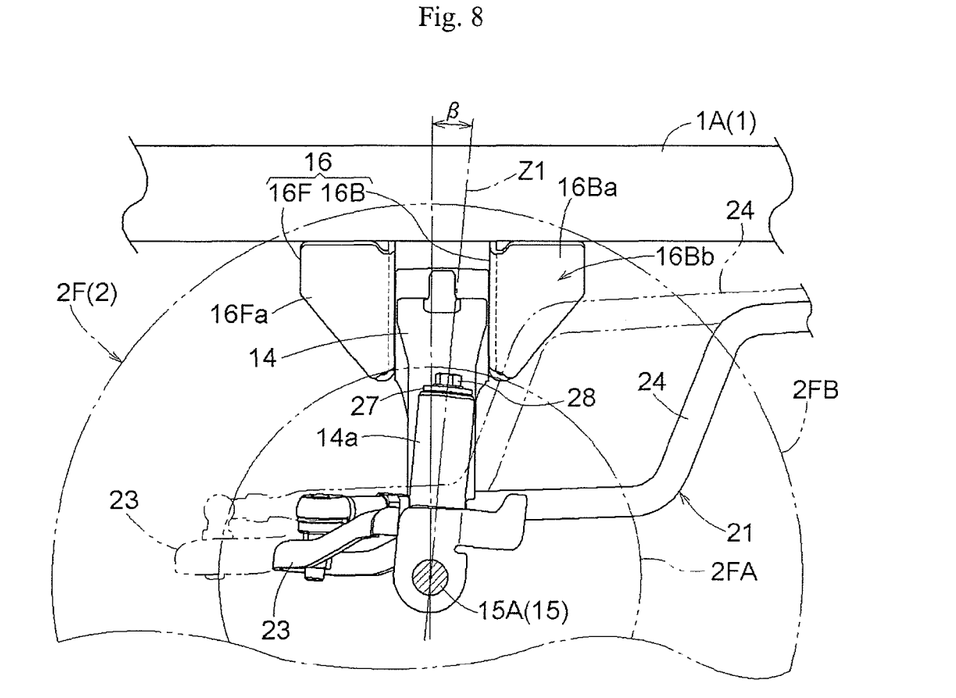
FIG. 8 is a front view in section showing the state when the front wheel is supported to the boss portion via the king pin.

As shown in FIG. 8, in the boss portion 14a, its axis (steering axis Z1) is inclined also towards the rear side as seen in a side view. Namely, the front wheel 2F is set with a caster angle ($\beta$) that inclines the steering axis Z1 rearwards as seen in the side view.

With the above-described arrangements, as the boss portion 14a is disposed closer to the width center of the front wheel 2F and this front wheel 2F is set with the king pin angle ($\alpha$), the distance between the width center C of the front wheel 2F and the steering axis Z1 (i.e. a scrub radius) is reduced, thus decreasing the steering force for steering the front wheel 2F. Further, with the setting of the caster angle ($\beta$) for the front wheel 2F, it is possible to set appropriately a resilient force back to a straight traveling state of the vehicle. In this way, a work vehicle having superior steerability can be realized.

Other Embodiments (1) In the foregoing embodiment, the front wheel 2F is set with king pin angle (α). However, such king pin angle (α) need not be set. Namely, the steering axis Z1 need not be inclined as seen in the front view.

(2) In the foregoing embodiment, the "steerable wheels" relating to the present invention comprises the front wheels 2F. However, the steerable wheels can comprise the rear wheels 2B. Further, the "steerable wheels" can be configured to be steerable and also drivable.

INDUSTRIAL APPLICABILITY

The present invention is applicable not only to a grass mower, but also to e.g. a utility vehicle, a tractor, a rice planter, a combine, etc. Further, this invention is applicable not only to an agricultural work vehicle, but also to a civil engineering work vehicle.

DESCRIPTION OF REFERENCE MARKS/NUMERALS

2F: front wheel (steerable wheel)
2R: rear wheel (drivable wheel)
13: steering wheel (operational member)
14: front axle frame (axle frame)
14a: boss portion
15: king pin
16: mount bracket
16Bb: recess
23: king pin arm (arm member)
24: drag link (link member)
C: width center
Z1: steering axis
α: king pin angle
β: caster angle

The invention claimed is:

1. A work vehicle comprising:
a pair of left and right steerable wheels;
a pair of left and right drivable wheels; and
a boss portion that supports a respective steerable wheel of the pair of left and right steerable wheels pivotally about a steering axis via a king pin, the boss portion being closer to a width center of the respective steerable wheel than a vehicle body inner lateral side end of the respective steerable wheel,
wherein the king pin has an approximately L-shape extending between the respective steerable wheel and the boss portion.

2. The work vehicle according to claim 1, wherein the respective steerable wheel is set with a caster angle that inclines the steering axis rearwards as seen in a side view.

3. The work vehicle according to claim 1, wherein the respective steerable wheel is set also with a king pin angle that inclines the steering axis towards a vehicle body laterally inner side as seen in the side view.

4. The work vehicle according to claim 1, further comprising:
an operating member for steering the steerable wheels; and
a link member that operably links the operating member with the steerable wheels, and
wherein the king pin includes an arm member to which the link member is connected.

5. The work vehicle according to claim 4, further comprising:
an axle frame that supports the pair of left and right steerable wheels; and
a mount bracket to which the axle frame is attached; and
wherein the mount bracket includes a recess for avoiding interference with the link member.

6. The work vehicle according to claim 1, wherein the work vehicle comprises a mid-mount type grass mower.

* * * * *